(12) United States Patent
Rakurty et al.

(10) Patent No.: US 11,964,336 B2
(45) Date of Patent: Apr. 23, 2024

(54) BAND SAW BLADE WITH IMPROVED BACK EDGE

(71) Applicant: The M.K. Morse Company, Canton, OH (US)

(72) Inventors: Chandra Sekhar Rakurty, Canton, OH (US); Roan Kirwin, Canton, OH (US)

(73) Assignee: THE M.K. MORSE COMPANY, Canton, OH (US)

( * ) Notice: Subject to any disclaimer, the term of this patent is extended or adjusted under 35 U.S.C. 154(b) by 218 days.

(21) Appl. No.: 17/340,735

(22) Filed: Jun. 7, 2021

(65) Prior Publication Data

US 2021/0379682 A1    Dec. 9, 2021

Related U.S. Application Data

(60) Provisional application No. 63/035,084, filed on Jun. 5, 2020.

(51) Int. Cl.
*B23D 61/12* (2006.01)

(52) U.S. Cl.
CPC .................. *B23D 61/123* (2013.01)

(58) Field of Classification Search
CPC .... B23D 61/123; B23D 55/02; Y10T 88/9317
USPC .................................. 83/835, 661
See application file for complete search history.

(56) References Cited

U.S. PATENT DOCUMENTS

| 239,710 | A | * | 4/1881 | Boynton | B23D 61/123 83/847 |
|---|---|---|---|---|---|
| 1,850,478 | A | * | 3/1932 | Schaefer | B23D 65/02 83/847 |
| 4,160,397 | A | * | 7/1979 | Bertini | B23D 61/123 83/835 |
| 4,195,543 | A | * | 4/1980 | Tapply | B23D 61/123 83/820 |
| 4,423,653 | A | * | 1/1984 | Howard | B23D 55/088 83/835 |
| 5,606,900 | A | * | 3/1997 | Stoddard | B23D 65/02 83/846 |
| 6,532,852 | B1 | * | 3/2003 | Tsujimoto | B23D 61/123 83/847 |
| 8,621,972 | B2 | | 7/2014 | Nagano | |
| 2008/0121079 | A1 | | 5/2008 | Hashimoto et al. | |

(Continued)

OTHER PUBLICATIONS

International Preliminary Report on Patentability Filed in the Corresponding PCT Application dated Dec. 6, 2022; 4 Pages.

(Continued)

*Primary Examiner* — Evan H MacFarlane
*Assistant Examiner* — Fernando A Ayala
(74) *Attorney, Agent, or Firm* — Black McCuskey

(57) ABSTRACT

A band saw blade can include a body extending in an endless ribbon, a cutting edge with cutting teeth, a back edge opposite the cutting edge, and a series of notches formed in the back edge. The notches can at least include first, second and third different notches. The notches can be arranged in a repeating pattern and each can be continuously arcuate. The notches can extend into the back edge a first depth. The notches can be separated from one another by a first distance. The notches can have respective radii of curvature and the radii of curvature can be different from one another.

11 Claims, 7 Drawing Sheets

(56) References Cited

U.S. PATENT DOCUMENTS

| | | | |
|---|---|---|---|
| 2013/0228059 A1* | 9/2013 | Kazda | B23D 61/123 83/835 |
| 2015/0075346 A1* | 3/2015 | Kullmann | B23D 61/123 83/661 |
| 2016/0114416 A1* | 4/2016 | Maiolo | B23D 61/123 83/835 |
| 2016/0167143 A1* | 6/2016 | Ivner | B23D 61/123 83/835 |
| 2019/0168321 A1* | 6/2019 | Petts | B23D 61/12 |

OTHER PUBLICATIONS

International Search Report Filed in the Corresponding PCT Application dated Jul. 30, 2021; 2 Pages.
Written Opinion Filed in the Corresponding PCT Application dated Jul. 30, 2021; 3 Pages.

* cited by examiner

BAND SAW BLADE WITH IMPROVED BACK EDGE

CROSS-REFERENCE TO RELATED APPLICATIONS

This application claims the benefit of U.S. Provisional Patent Application Ser. No. 63/035,084 for a SAW WITH IMPROVED BACK EDGE, filed on Jun. 5, 2020, which is hereby incorporated by reference in its entirety.

BACKGROUND

The present disclosure relates in general to cutting tools.

For a given blade, the number of teeth per inch of length of a cutting edge, the "TPI," is fixed. The TPI along with gullet size, width and depth of the space between the teeth generally dictates the kinds of material that can be cut with the blade. The TPI of a blade also tends to dictate the range of workpiece sizes that can be cut with the blade. Blades with a low TPI generally deliver faster cuts with rougher edges and are ideal for cutting wood. A general rule of thumb is that a saw blade with more teeth results in a smoother cut and a saw blade with fewer teeth results in a faster cut. Other considerations impact the cut quality and the feed speed, such as how fast the material is fed into the saw blade and how fast the saw blade is turning.

FIG. 1 is a side view of a blade during a cutting process. A blade 10 includes at least one tooth 12. The tooth 12 defines a tip 14 and a rake face 16. The blade 10 is passing through a workpiece 18 to remove material from the workpiece 18. The direction of movement of the blade 10 is referenced at 20. A present outer surface of the workpiece 18 is referenced at 22 and a cutting depth is referenced at 24. A surface that will be exposed after the cutting motion is referenced at 26.

SUMMARY

A band saw blade can include a body, a cutting edge, a back edge, and a series of notches formed in the back edge. The body can extend in an endless ribbon. The cutting edge can be on a first side of the body. The cutting edge can define a plurality of cutting teeth configured to engage and remove material from a workpiece during movement of the body across the workpiece in a cutting direction. The cutting edge can be substantially flat. The back edge can be on a second side of the body opposite of the first side. The back edge can be otherwise flat. The series can be arranged in the back edge in a repeating pattern. The series of notches can have a first continuously arcuate notch. The first continuously arcuate notch can have a first radius of curvature and a first width along the back edge and can extend into the back edge a first depth. The series of notches can also have a second continuously arcuate notch having a second radius of curvature and a second width along the back edge. The second continuously arcuate notch can extend into the back edge the first depth. The second continuously arcuate notch can be adjacent to the first continuously arcuate notch along the back edge and can be spaced a first distance from the first continuously arcuate notch along the back edge. The series of notches can also have a third continuously arcuate notch can have a third radius of curvature and a third width along the back edge. The third continuously arcuate notch can extend into the back edge the first depth. The third continuously arcuate notch can be adjacent to the second continuously arcuate notch along the back edge and can be spaced the first distance from the second continuously arcuate notch along the back edge. The second continuously arcuate notch can thus be positioned between the first continuously arcuate notch and the third continuously arcuate notch along the back edge. The first radius of curvature and the second radius of curvature and the third radius of curvature can all be different from one another.

According to other features, the first depth can be less than one hundredth of one inch. All of the first radius of curvature and the second radius of curvature and the third radius of curvature can be at least four orders of magnitude greater than the first depth. The smallest of the first radius of curvature and the second radius of curvature and the third radius of curvature can be at least two-thirds of the largest of the first radius of curvature and the second radius of curvature and the third radius of curvature. The first distance can be greater than all of the first width and the second width and the third width.

In other features, the smallest of the first width and the second width and the third width can be at least three-quarters of the largest of the first width and the second width and the third width. All of the first radius of curvature and the second radius of curvature and the third radius of curvature can be at least one hundred and thirty inches. All of the first width and the second width and the third width can be at least three inches. All of the first radius of curvature and the second radius of curvature and the third radius of curvature can be less than two hundred inches. All of the first width and the second width and the third width can be between three and four inches.

A method of using the band saw blade can include arranging the endless ribbon of the body of the band saw blade around a driving wheel and a driven wheel of a band saw arrangement. The method can also include engaging the plurality of cutting teeth of the cutting edge on the first side of the body with the workpiece. The method can also include rotating the driving wheel to move the body across the workpiece in a cutting direction and thereby remove material from the workpiece. The method can also include supporting the back edge on the second side of the body opposite of the first side with at least one roller having a fourth radius of curvature. The at least one roller can ride in the series of notches formed in the back edge as the body moves, including riding into and out of the first continuously arcuate notch and the second continuously arcuate notch and the third continuously arcuate notch.

According to additional features, a radius of curvature of the roller can be less than the first radius of curvature and the second radius of curvature and the third radius of curvature. The method can also include feeding the band saw blade through the workpiece at a continuously positive feed rate in a feeding direction, wherein the feeding direction orthogonal to the movement across the workpiece. The method can also include maintaining an axis of rotation of the at least one roller a second distance away from a plane containing the back edge wherein the second distance is equal to the fourth radius of curvature. As a result, respective portions of the body at the first continuously arcuate notch and the second continuously arcuate notch and the third continuously arcuate notch are at least partially deflect away from the workpiece and against the at least one roller.

Various aspects will become apparent to those skilled in the art from the following detailed description and the accompanying drawings.

DETAILED DESCRIPTION

The present disclosure provides a blade that can have a longer life. The present disclosure includes altering a standard blade to include a profile formed in a back edge of the blade. During passage of the blade through a workpiece, the portion of the blade that defines the profile can elastically deflect away from workpiece. In operation, the blade can rock back and forth in the cut, like a logger cuts wood. The deflection of the blade can be in response to the rise of a high stress sticking zone in the cut, helping the tips of the teeth of the blade to last longer.

Figure 1:
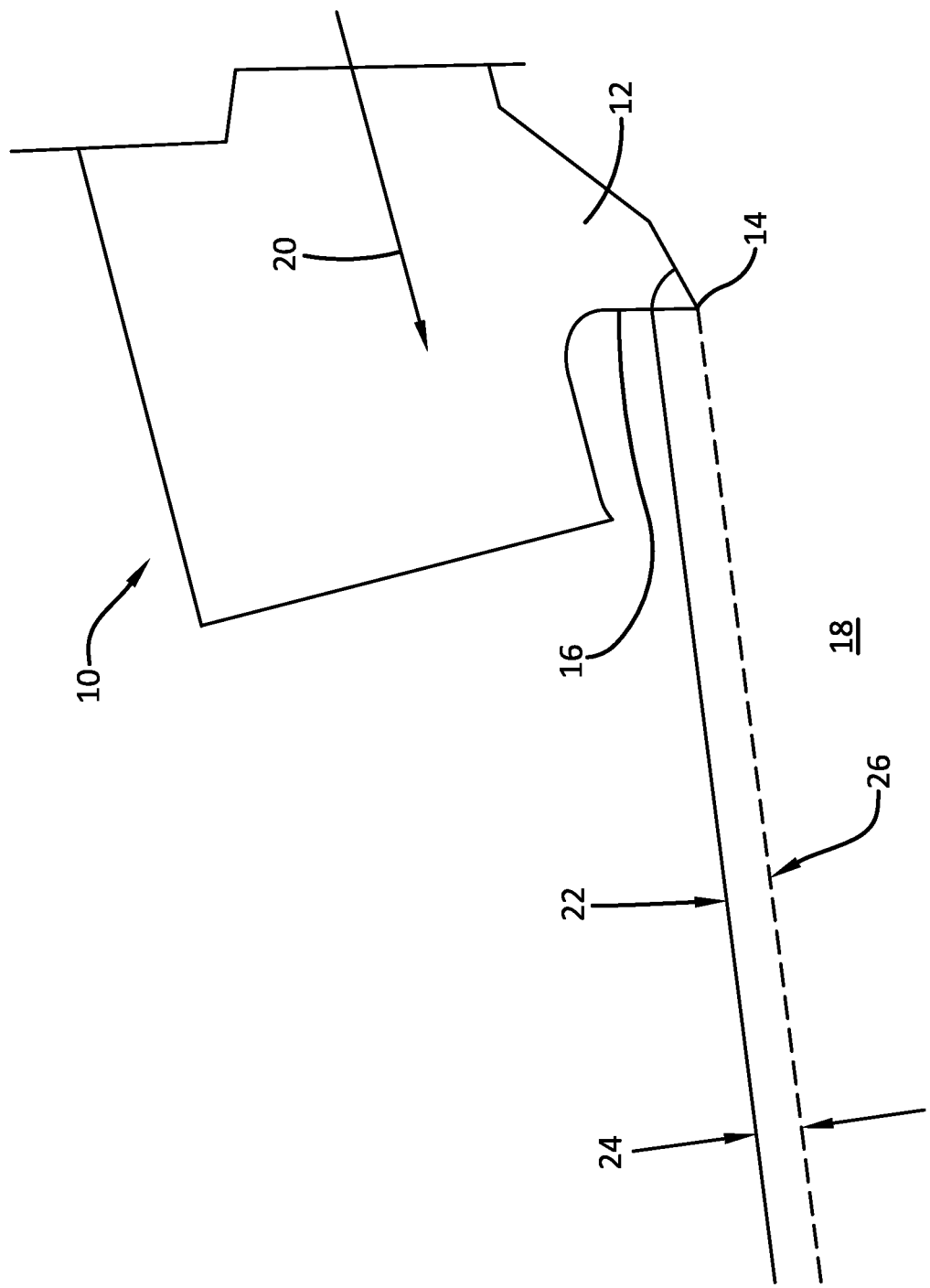
FIG. 1 is a side view of a blade during a cutting process according to the prior art.
Figure 2:
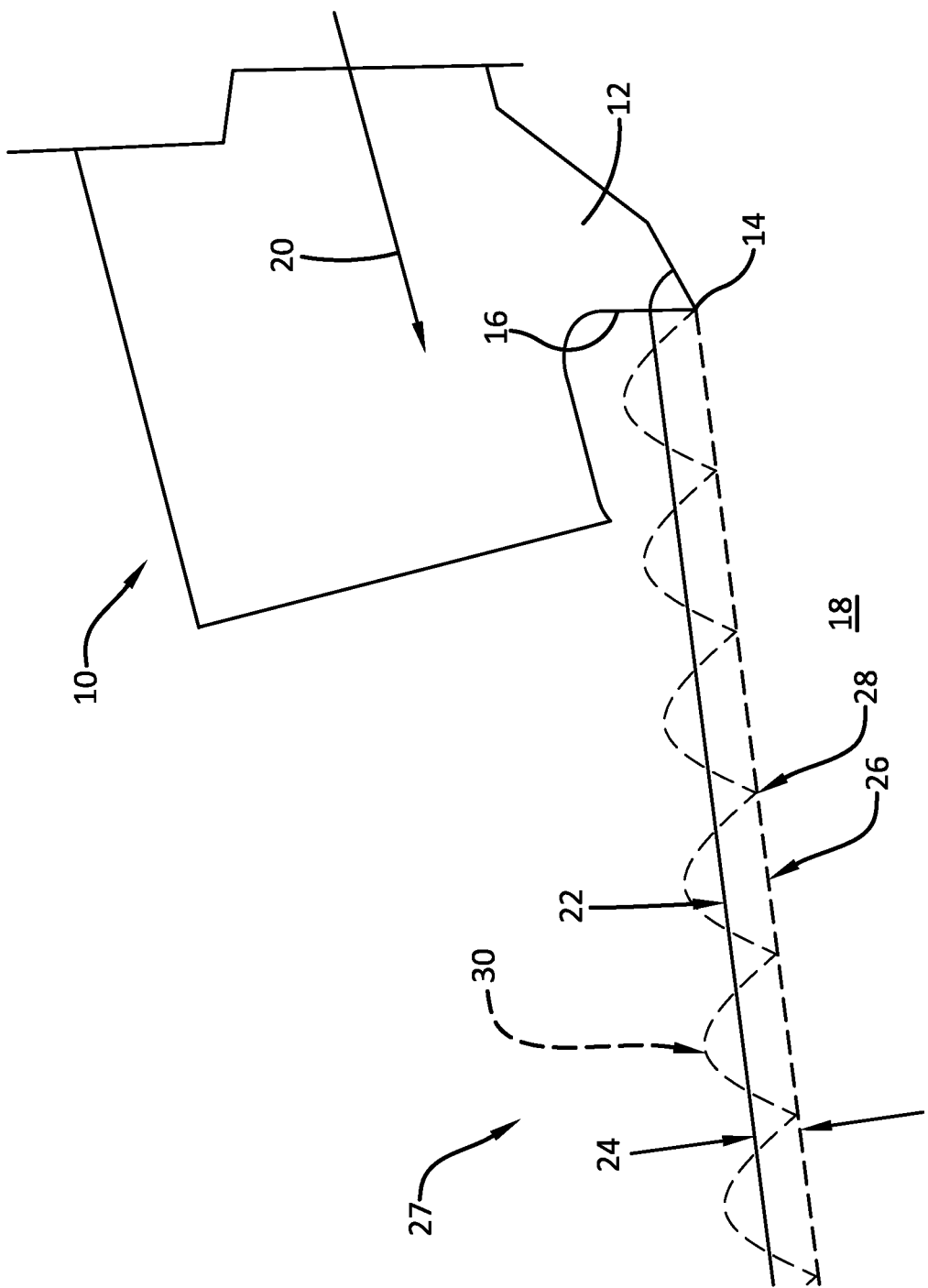
FIG. 2 is a side view of a blade during a cutting process according to the present disclosure.

Referring now to the drawings, there is illustrated in FIG. 2 a side view of the blade 10 during a cutting process in which the blade 10 is pulsated in and out of the cut. An exemplary path 27 of motion of the tip 14 is represented by solid-line portions and dashed-line portions. The exemplary path 27 reflects movement across the workpiece 18 (lateral or horizontal movement relative to the perspective of FIG. 2) and feeding movement towards and away from the workpiece 18 (vertical movement relative to the perspective of FIG. 2). The feeding movement and the lateral movement are orthogonal to one another. An exemplary solid-line portion of the path 27 is referenced at 28. During the movement along the portion of the path 27 referenced by solid-line portions, the tooth 12 is engaged with the workpiece and removing material. An exemplary dashed-line portion of the path 27 is referenced at 30. During the movement along the portion of the path 27 referenced by dashed-line portions, the tooth 12 is disengaged with the workpiece and not removing material. The exemplary path 27 thus defines a pulsating motion of the blade 10, the motion having a frequency and an amplitude.

The path 27 is exemplary. Paths applied to the blade 10 in other embodiments of the present disclosure can be differently shaped. In one example, the blade 10 can be moved along a path appearing as a square-wave. When such a path is chosen, the tooth 12 can move linearly through part of the workpiece 18, can be raised vertically away from the workpiece 18, can move linearly over the workpiece 18, and then be lowered vertically back into the workpiece 18.

A bandsaw tool can be configured to move the blade 10 along the path 27. In the prior art, a bandsaw is operated based on selecting the speed of the blade 10 and the feed rate. The speed of the blade 10 corresponds to movement of the blade 10 in a direction across the workpiece 18. The feed rate corresponds to movement of the blade 10 into the workpiece 18. For movement along the path 27, a bandsaw can be configured to be operated based on selecting the speed of the blade 10, the feed rate, a frequency, and an amplitude.

Figure 3:
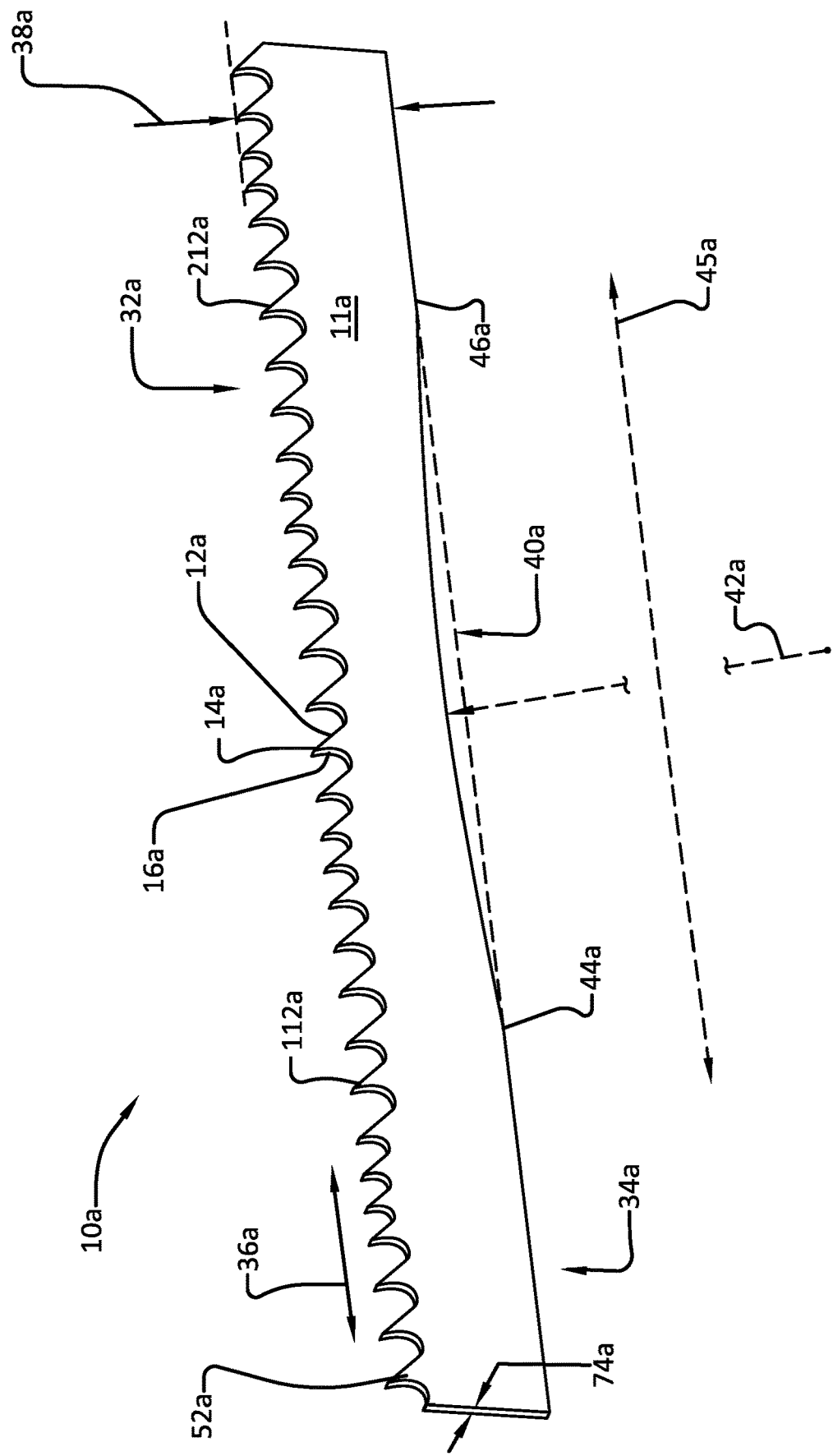
FIG. 3 is a perspective view of a portion of a blade according to another aspect of the present disclosure.

Referring now to FIG. 3, an exemplary embodiment of the present disclosure provides a blade with a profile in a back edge of the blade. An exemplary blade 10a is a bandsaw blade. Only a portion of the blade 10a is shown. The blade 10a includes a body 11a that extends in an "endless ribbon," as that term is used in U.S. Pat. No. 4,195,543 which is incorporated by reference for at least that purpose.

A cutting edge 32a on a first side of the body 11a defines a plurality of cutting teeth configured to engage and remove material from the workpiece 18a during movement of the body 11a across the workpiece 18a in a cutting direction. The exemplary cutting edge 32a is substantially flat. The plurality of teeth includes the at least one tooth 12a that defines a tip 14a and a rake face 16a. The tooth 12a projects away from the front edge 32a of the blade 10a.

The exemplary blade 10a also includes a back edge 34a on a second side of the body 11a opposite of the first side and thus opposite to the front edge 32a. A length of the exemplary blade 10a can be defined along the edges 32a, 34a, along the endless ribbon, such as by an axis referenced at 36a. A height of the exemplary blade 10a can be defined perpendicular to the length, such as by an axis referenced at 38a. The height is defined as the distance between the tips 14a and the back edge 34a.

In the exemplary embodiment, the blade 10a includes a series of notches formed in the back edge 34a whereby the height varies along the length. The back edge 34a is otherwise flat. FIG. 3 shows a continuously arcuate notch 40a formed in the back edge 34a. The exemplary notch 40a does not include any planar/flat surface portions. The exemplary continuously arcuate notch 40a is defined by a radius of curvature, referenced at 42a. A "depth" of the continuously arcuate notch 40a at any location along the length 36a can be defined as the reduction or loss of the height 38a of the blade 10a from the maximum height 38a of the blade 10a. The maximum depth of a continuously arcuate notch in the back edge 34a can be less than or equal to about twice the tooth height in one or more embodiments of the present disclosure. In one or more embodiments of the present disclosure, the maximum depth can be chosen without reference to the tooth height. For example, in one or more embodiments of the present disclosure, the maximum depth can be less than one hundredth of an inch.

The exemplary arcuate continuously arcuate notch 40a extends a width 45a between locations 44a and 46a of the back edge 34a. The exemplary locations 44a and 46a are separated from one another along the length of the blade 10a by the width 45a. The height of the exemplary blade 10a reduces along the length from the location 44a to approximately the location of the tooth 12a. The height of the exemplary blade 10a increases along the length from the tooth 12a to the location 46a.

Figure 4:
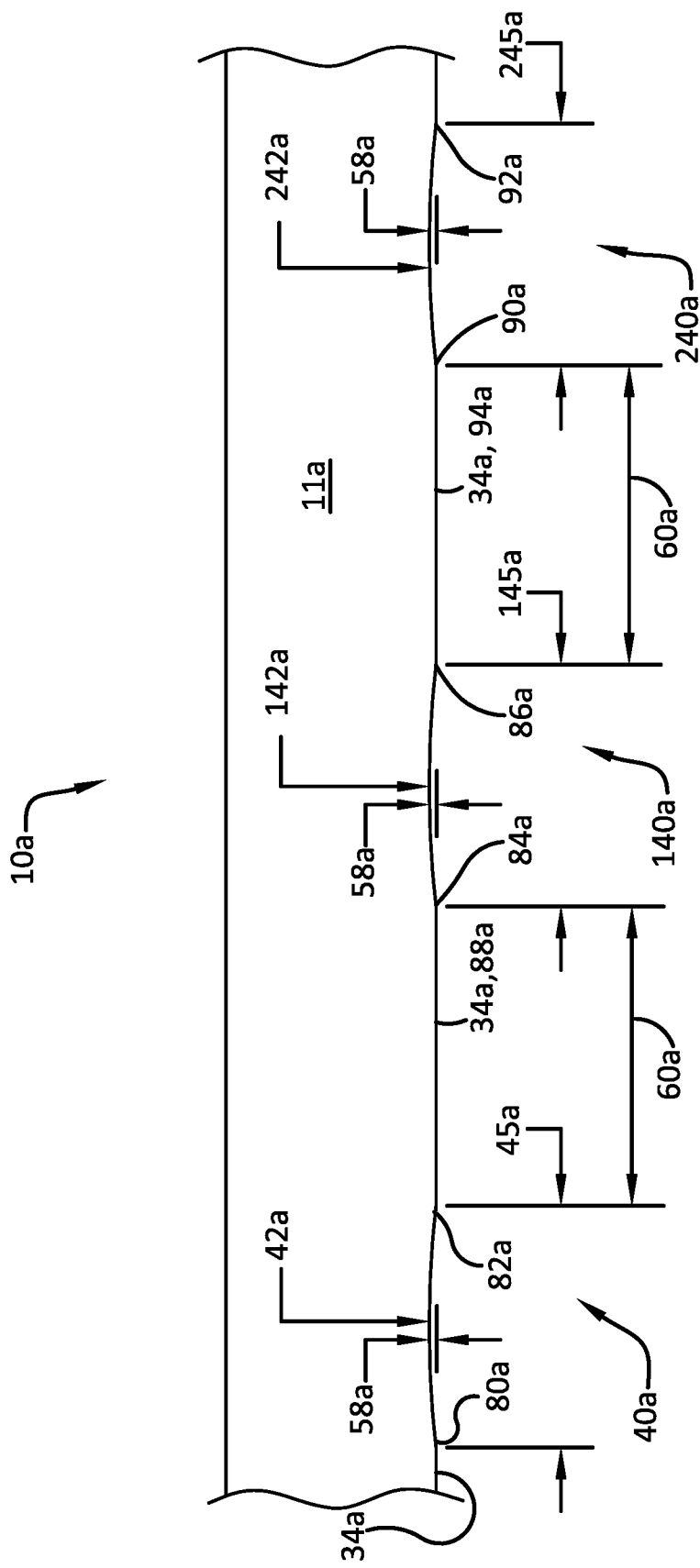
FIG. 4 is a side, planar view of a larger portion of the blade partially shown in FIG. 3.

FIG. 4 is front, planar view of a portion of the blade partially shown in FIG. 3. The exemplary blade 10 includes a series of notches arranged in the back edge 34a in a repeating pattern. FIG. 4 is a view of the series and the series repeats, over and over, in the back edge 34a along the endless ribbon. The series of notches includes the first continuously arcuate notch 40a, a second continuously arcuate notch 140a, and a third continuously arcuate notch 240a. As set forth above, the first continuously arcuate notch 40a has the first radius of curvature 42a, the first width 45a along the back edge 34a, and extends into the back edge 34a a first depth 58a. The exemplary first continuously arcuate notch 40a extends from a first position 80a along the back edge 34a to a second position 82a along the back edge 34a. The exemplary first width 45a is defined between the first position 80a and the second position 82a along the back edge 34a.

The second continuously arcuate notch 140a has a second radius of curvature 142a and a second width 145a along the back edge 34a. The second continuously arcuate notch 140a can extend into the back edge 34a the first depth 58a. The exemplary second continuously arcuate notch 140a is adjacent to the first continuously arcuate notch 40a along the back edge 34a. The exemplary second continuously arcuate notch 140a is spaced a first distance 60a from the first continuously arcuate notch 40a along the back edge 34a. The exemplary second continuously arcuate notch 140a extends from a third position 84a along the back edge 34a to a fourth position 86a along the back edge 34a. The exemplary first distance 60a is defined by a first length 88a along the back edge 34a between the second position 82a and the third position 84a. The exemplary second width 145a is defined between the third position 84a and the fourth position 86a along the back edge 34a.

The third continuously arcuate notch 240a has a third radius of curvature 242a and a third width 245a along the back edge 34a. The third continuously arcuate notch 240a can extend into the back edge 34a the first depth 58a. The exemplary third continuously arcuate notch 240a is adjacent to the second continuously arcuate notch 140a along the back edge 34a. The exemplary third continuously arcuate notch 240a is spaced the first distance 60a from the second continuously arcuate notch 140a along the back edge 34a. The second continuously arcuate notch 140a thus positioned between the first continuously arcuate notch 40a and the third continuously arcuate notch 240a along the back edge 34a. The exemplary third continuously arcuate notch 240a extends from a fifth position 90a along the back edge 34a to a sixth position 92a along the back edge 34a. The exemplary first distance 60a is also defined by a second length 94a along the back edge 34a between the fourth position 86a and the fifth position 90a. The exemplary third width 245a is defined between the fifth position 90a and the sixth position 92a along the back edge 34a. With respect to the perspective of FIG. 4, another series begins, a distance equal to the first distance 60a, to the right of the third continuously arcuate notch 240a and another series ends, a distance equal to the first distance 60a, to the left of the first continuously arcuate notch 40a. This pattern continues along the full distance of the back edge 34a of the endless ribbon.

The first radius of curvature 42a and the second radius of curvature 142a and the third radius of curvature 242a are all different from one another. In an exemplary embodiment, the first radius of curvature 42a is 160.56 inches, the second radius of curvature 142a is 142.227 inches, and the third radius of curvature 242a is 190.143 inches. Thus, in such an embodiment, the smallest of the first radius of curvature 42a and the second radius of curvature 142a and the third radius of curvature 242a is at least two-thirds of the largest of the first radius of curvature 42a and the second radius of curvature 142a and the third radius of curvature 242a. Also, in such an embodiment, all of the first radius of curvature 42a and the second radius of curvature 142a and the third radius of curvature 242a are at least one hundred and thirty inches and all of the first radius of curvature 42a and the second radius of curvature 142a and the third radius of curvature 242a are less than two hundred inches. In an exemplary embodiment, the first depth is 0.009 inch. In such an embodiment, all of the first radius of curvature 42a and the second radius of curvature 142a and the third radius of curvature 242a can be at least four orders of magnitude greater than the first depth 58a. In an exemplary embodiment, all of the first width 45a and the second width 145a and the third width 245a can be between three and four inches. For example, the first width 45a can be 3.4 inches, the second width 145a can be 3.2 inches, and the third width 245a can be 3.7 inches. In such an embodiment, the smallest of the first width 45a and the second width 145a and the third width 245a is at least three-quarters of the largest of the first width 45a and the second width 145a and the third width 245a. Also, in such an embodiment, all of the first width 45a and the second width 145a and the third width 245a are at least three inches. In an exemplary embodiment, the first distance 60a is 4.5 inches. In such an embodiment, the first distance 60a is thus greater than all of the first width 45a and the second width 145a and the third width 245a. In an exemplary embodiment, the blade 10a has a blade height that is 2.58 inches. Embodiments of the present disclosure can include a blade having a blade height in the range of 0.5 inch to 3 inches. In an exemplary embodiment, the tooth height of teeth on the blade 10a can be around 67 mm. Embodiments of the present disclosure can include a blade having teeth with a tooth height in the range of 32 mm-76 mm. In an exemplary embodiment, the height of teeth on the blade can vary along the length of the blade. For example, a first tooth can have a height of 67.77 mm, a second tooth immediately adjacent to and behind the first tooth in the cutting direction can have a height of 67.73 mm, a third tooth immediately adjacent to and behind the second tooth in the cutting direction can have a height of 67.72 mm, and so on if desired, in an exemplary sequence of a plurality of teeth having a 0.05 mm tooth height variation. The blade can include a plurality of such sequences adjacent to one another such that the tallest tooth of a first sequence is immediately followed by the shortest tooth of the next sequence. Embodiments of the present disclosure can include a blade having teeth with a tooth height in the range of 32 mm-76 mm. In an exemplary embodiment, the thickness of the blade 10a is 0.63 inch. The thickness is referenced at 74a in FIG. 3. Embodiments of the present disclosure can include a blade having a thickness in the range of 0.25-0.63 inch.

Figure 5:
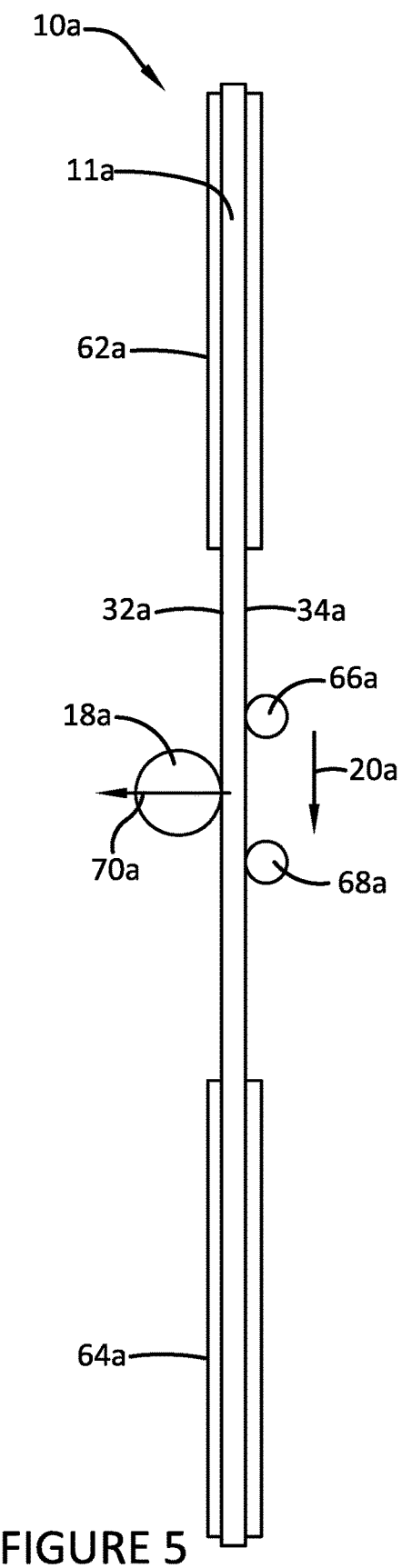
FIG. 5 is a front, planar and schematic view of a band saw arrangement including the blade partially shown in FIGS. 3 and 4.
Figure 6:
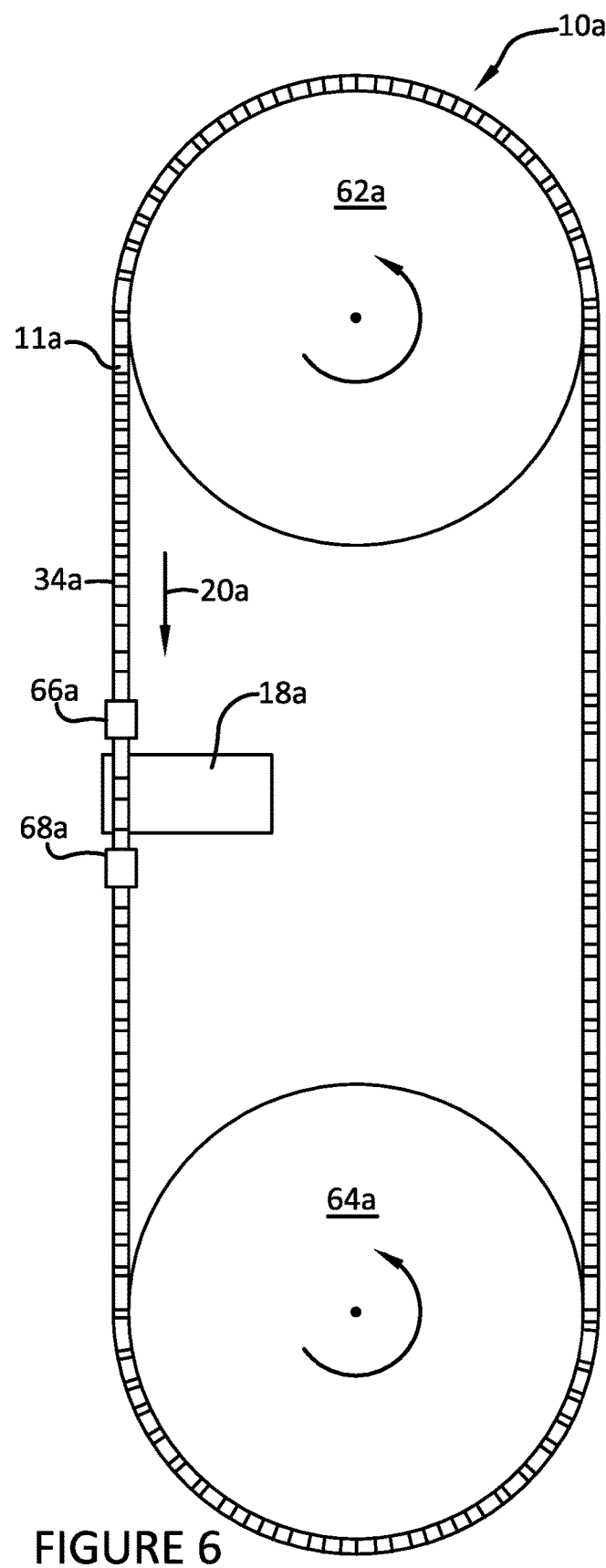
FIG. 6 is left-side, planar view of the band saw arrangement shown in FIG. 5.

Referring now to FIGS. 5 and 6, in a method of using the band saw blade 10a, the endless ribbon of the body 11a of the band saw blade 10a can be arranged around a driving wheel 62a and a driven wheel 64a of a band saw arrangement. The plurality of cutting teeth of the cutting edge 32a on the first side of the body 11a can be engaged with a workpiece 18a. The driving wheel 62a can be rotated to move the body 11a across the workpiece 18a in a cutting direction 20a and thereby remove material from the workpiece 18a.

Figure 7:
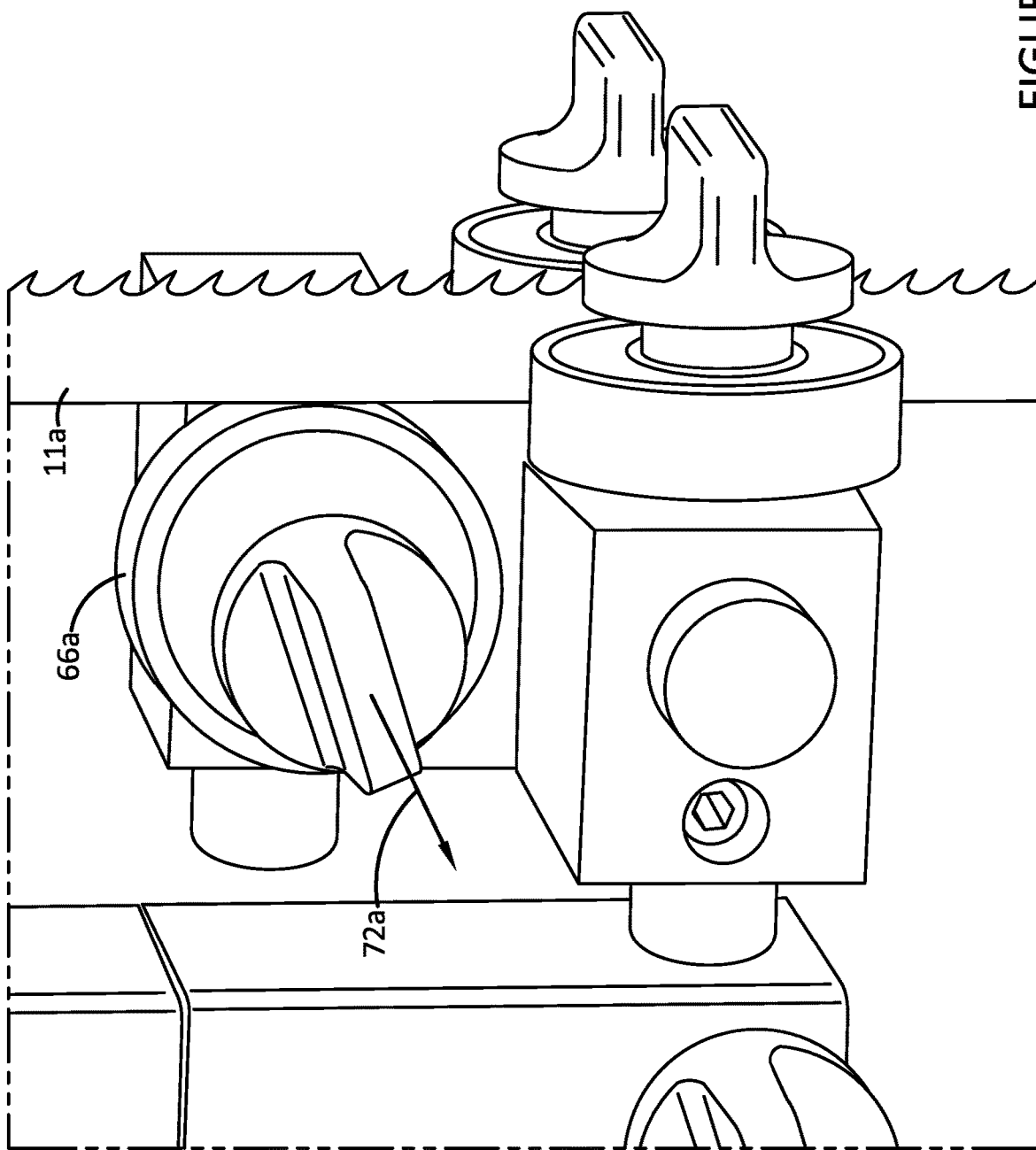
FIG. 7 is an isometric and detail view of a portion of the band saw arrangement shown schematically in FIGS. 5 and 6.

Rollers 66a, 68a, each having a radius of curvature, can support the back edge 34a on the second side of the body 11a opposite of the first side. FIG. 7 is an isometric and detail view of the roller 66a schematically in FIGS. 5 and 6, with the axis of rotation of the roller 66a referenced at 72a. The exemplary rollers 66a, 68a ride in the series of notches 42a, 142a, 242a formed in the back edge 34a as the body 11a moves. The exemplary rollers 66a, 68a ride into and out of the first continuously arcuate notch 40a and the second continuously arcuate notch 140a and the third continuously arcuate notch 240a during movement of the blade 10a. Both of the rollers 66a, 68a can have respective radii of curvature that are less than all of the first radius of curvature 42a and the second radius of curvature 142a and the third radius of curvature 242a, so that the rollers 66a, 68a are fully received in the notches 40a, 140a, 240a.

The band saw blade 10a can be fed through the workpiece 18a at a continuously positive feed rate in a feeding direction. The feeding direction is referenced at 70a in FIG. 5 and is orthogonal to the movement 20a across the workpiece 18a. The feeding direction is into the page relative to FIG. 6. The exemplary feed rate is continuously positive in that the blade 10a is not oscillated between the direction 70a and a direction opposite to the direction 70a.

The axis 72a of rotation of the roller 66a can be maintained a predetermined distance away from a plane containing the back edge 34a. The notches 40a, 140a, 240a extend away from this plane. This predetermined distance can be equal to the radius of curvature of the roller 66a. Thus, when the roller 66a and the back edge 34a are aligned, the roller 66a contacts the back edge 34a and supports the back edge 34a and prevents movement of the body 11a of the blade 10a away from the workpiece 18a. When the roller 66a and respective portions of the body 11a at the first continuously arcuate notch 40a and the second continuously arcuate notch 140a and the third continuously arcuate notch 240a are aligned, the body 11a of the blade 10a is permitted to elastically deflect away from the workpiece 18a.

When the roller 66a and the first continuously arcuate notch 40a are aligned with one another, the body 11a of the blade 10a is permitted to elastically deflect away from the workpiece 18a as the roller 66a maintains contact with the first continuously arcuate notch 40a and controls the extent of elastic deflection. When the roller 66a and the second continuously arcuate notch 140a are aligned with one another, the body 11a of the blade 10a is permitted to elastically deflect away from the workpiece 18a as the roller 66a maintains contact with the second continuously arcuate notch 140a and controls the extent of elastic deflection. When the roller 66a and the third continuously arcuate notch 240a are aligned with one another, the body 11a of the blade 10a is permitted to elastically deflect away from the workpiece 18a as the roller 66a maintains contact with the third continuously arcuate notch 240a and controls the extent of elastic deflection.

Because the notches 40a, 140a, 240a have different radii of curvature, the rate of deflection of the body 11a is different as the roller 66a aligns with the different notches 40a, 140a, 240a. However, in the exemplary embodiment, the first depth 58a is the same and thus the extent of deflection of the body 11a is the same at all of the notches 40a, 140a, 240a. Also, because the notches 40a, 140a, 240a are continuously arcuate, the deflections do not include abrupt periods, such as would occur if any of the notches 40a, 140a, 240a had a straight portion extending parallel to the direction 70a. Such abrupt deflections would elevate stress levels in the body 11a and the roller 66a.

Figure 8:
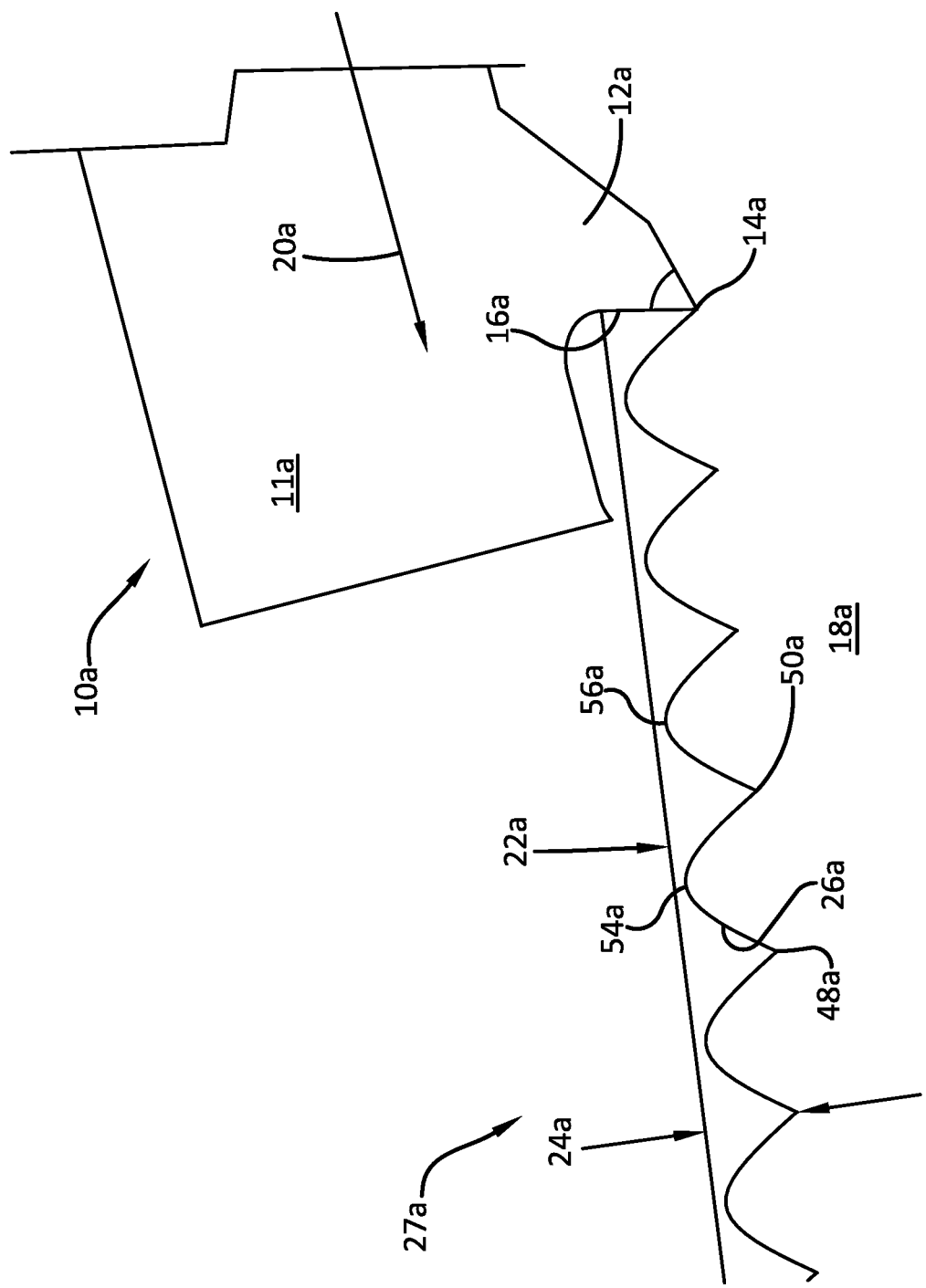
FIG. 8 is a side view of the blade shown in FIG. 3 during a cutting process according to one or more embodiments of the present disclosure.

Referring now to FIG. 8, in a cutting operation with the blade 10a, the blade 10a is passing through the workpiece 18a to remove material from the workpiece 18a. A present outer surface 22a of the workpiece 18a will be removed to the cutting depth 24a to expose the surface 26a. It is noted that FIG. 8 and line 26a is illustrative and not drawn to scale.

An exemplary path 27a is illustrative relative cutting depths occurring due to motion of the body 11a and the tips of the blade teeth when the blade 10a elastically deforms. The distance between the line 22a and the path/line 27a/26a represents the depth of cut. The lowest points along the line 26a, such as points 48a and 50a, represent the cut created by teeth that are not adjacent to one of notches 40a, 140a, 240a along the back edge 34a, such as tooth 52a in FIG. 3. This cut is the deepest cut. The highest points along the line 26a, such as points 54a and 56a, represent the cut created by teeth that are adjacent to the lowest point of notches 40a, 140a, 240a along the back edge 34a, such as tooth 12a in FIG. 3. This cut is the shallowest cut. The points along the line 26a between a lowest point and a highest point represent cuts created by teeth that are between the tooth 12a and a tooth 112a and that are between the tooth 12a and a tooth 212a in FIG. 3. The teeth 112a, 212a are at opposite ends of the notch 40a.

During movement of the blade 10a, the portions of the blade 10a that include one of the notches 40a, 140a, 240a will be slightly deflected elastically away from the workpiece 18a. Teeth adjacent to one of the notches 40a, 140a, 240a will be urged away from the cut. However, as illustrated in FIG. 8, these teeth will not be separated from the cut and will continue to remove material from the workpiece 18a. Rather, the depth of the cut will reduce slightly. The teeth adjacent to one of the notches 40a, 140a, 240a will remain engaged with the workpiece 18a and will be removing material. The instantaneous depth of cut is thus varying. This reduces notch wear and the high temperature point, thereby increasing tool-life. The blade 10a acts like a quasi-vibrational-assisted tool and the sticking (or high stress) zone is reduced, helping the tool-tip to last longer. It can be desirable to apply a higher feed when using the blade 10a to keep the teeth in the cut. The blade 10a will also tend to rock back and forth in the cut like a logger cutting wood. Compared to straight back-edge, the blade 10a reduces the cross section of the cut at any given instance, thus momentarily reducing chip loads.

The teachings of the present disclosure increases blade-life when implemented. For the blade 10a, the typical break-in process in which the initial feed rate is relatively slow is not recommended, since it may cause the teeth to leave the cut. A higher feed is recommended to keep the teeth in cut. It is noted that the attributes of a profile can be based on the number of teeth per inch of the blade and also on the qualities of the material being cut.

Details of testing of exemplary embodiments of the present disclosure against non-embodiments (blades having a fully flat back edge) are set forth below.

TABLE 1

| Workpiece | | Embodiment | | | Non-Embodiment | | |
|---|---|---|---|---|---|---|---|
| Grade | Size | # Cut | Area | Feed | # Cut | Area | Feed |
| NO6625 | 16 | 5 | 1004.28 | 0.157 | 3 | 602.88 | 0.12 |
| NO4400 | 17 | 1 | 226.87 | 0.27 | n/a | | |
| NO4400 | 8.5 | 1 | 56.72 | 0.27 | n/a | | |
| K3403 (415 Brinell) | 17.5 | 2 | 240.41 | 0.16 | n/a | | |
| | TOTAL: | 9 | 1528.79 | | 3 | 602.88 | |

In the testing that produced the results set forth in Table 1, a blade being an embodiment of the present disclosure was tested against a blade with a straight/flat back edge. The designation "# Cut" refers to the number of workpieces that were cut before the respective blade failed. A blade failure was defined when the respective blade lost a tooth. The non-embodiment blade, for example, failed after three (3) workpieces were cut while the embodiment blade cut through nine (9) workpieces. All of the workpieces in these tests were round in cross-section. The designation "Area" refers to the total square area cut by the respective blade, in square inches, before the respective blade failed. The designation "Feed" refers to feed rate. During testing, the instantaneous condition of the respective blade was monitored and the feed rate was maximized to the extent possible in view of the instantaneous condition of the respective blade. The blade speed was the same for both blades during cutting of NO6625 workpieces. As shown in Table 1, the embodiment blade cut 154% more area than the non-embodiment blade and permitted a greater feed rate than the non-embodiment blade.

TABLE 2

| Workpiece | | Embodiment | | | Non-Embodiment | | |
|---|---|---|---|---|---|---|---|
| Grade | Size | # Cut | Area | Feed | # Cut | Area | Feed |
| K3403 (415 Brinell) | 17.5 | 3 | 360.62 | 0.157 | 3 | 360.62 | 0.12 |
| G41300MO1 | 20 | 5 | 1570 | 0.45 | n/a | | |
| R50700xxx | 18 | 3 | 763.02 | 0.157 | n/a | | |
| NO6625 | 16 | 2 | 401.92 | 0.157 | n/a | | |
| | TOTAL: | 13 | 3095.56 | | 3 | 360.62 | |

In the testing that produced the results set forth in Table 2, a blade being an embodiment of the present disclosure was tested against a blade with a straight/flat back edge. All of the workpieces were round in cross-section. During testing, the instantaneous condition of the respective blade was monitored and the feed rate was maximized to the extent possible in view of the instantaneous condition of the respective blade. The blade speed was the same for both blades during cutting of K3403 (415 Brinell) workpieces. As shown in Table 2, the embodiment blade cut 758% more area than the non-embodiment blade and permitted a greater feed rate than the non-embodiment blade.

TABLE 3

| Workpiece | | Embodiment | | | Non-Embodiment | | |
|---|---|---|---|---|---|---|---|
| Grade | Size | # Cut | Area | Feed | # Cut | Area | Feed |
| 300M | 34 | 5 | 4537.30 | 0.143 | 5 | 4537.50 | 0.11 |

In the testing that produced the results that are set forth in Table 3, a blade being an embodiment of the present disclosure was tested against a blade with a straight/flat back edge. All of the workpieces were round in cross-section. During testing, the instantaneous condition of the respective blade was monitored and the feed rate was maximized to the extent possible in view of the instantaneous condition of the respective blade. The blade speed was the same for both blades during cutting of 300 M workpieces. As shown in Table 3, the embodiment blade permitted a greater feed rate than the non-embodiment blade and, based on the size of the workpieces, the greater feed rate resulted in a time savings of seventy-one minutes for each workpiece. Cutting a workpiece by the embodiment blade took seventy-one minutes less than cutting a workpiece by the non-embodiment blade.

TABLE 4

| Workpiece | | Embodiment | | | Non-Embodiment | | |
|---|---|---|---|---|---|---|---|
| Grade | Size | # Cut | Area | Feed | # Cut | Area | Feed |
| NO5500 | 14 × 14 | 3 | 588 | 0.15 | 3 | 588 | 0.12 |
| NO5500 | 10 × 10 | 7 | 700 | 0.20 | n/a | | |
| NO5500 | 12.38 × 6 | 6 | 267.12 | 0.28 | n/a | | |
| NO5500 | 11.13 × 3 | 12 | 400.68 | 0.35 | n/a | | |
| | TOTAL: | 28 | 1955.8 | | 3 | 588 | |

In the testing that produced the results that are set forth in Table 4, a blade being an embodiment of the present disclosure was tested against a blade with a straight/flat back edge. All of the workpieces were rectangular in cross-section. During testing, the instantaneous condition of the respective blade was monitored and the feed rate was maximized to the extent possible in view of the instantaneous condition of the respective blade. The blade speed was the same for both blades during cutting of NO5500 workpieces. As shown in Table 4, the embodiment blade cut 233% more area than the non-embodiment blade and permitted a greater feed rate than the non-embodiment blade.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A band saw blade comprising:
    a body extending in an endless ribbon;
    a cutting edge on a first side of said body, said cutting edge defining a plurality of cutting teeth configured to engage and remove material from a workpiece during movement of said body across the workpiece in a cutting direction, said plurality of teeth including at least one sequence of teeth having a variable height with a tooth height variation defined by a difference in height between a height of a tallest tooth of said sequence and a height of a shortest tooth of said sequence;
    a back edge on a second side of said body opposite of said first side;
    a series of notches formed in said back edge, said back edge otherwise flat, said series arranged in said back edge in a repeating pattern, and said series of notches having:
        a first continuously arcuate notch having a first radius of curvature and a first width along said back edge and extending into said back edge a first depth along said first radius of curvature, said first depth being a maximum depth of said first continuously arcuate notch, said first continuously arcuate notch extending from a first position along said back edge to a second position along said back edge, said first width defined between said first position and said second position along said back edge;

a second continuously arcuate notch having a second radius of curvature and a second width along said back edge and extending into said back edge said first depth along said second radius of curvature, said first depth being a maximum depth of said second continuously arcuate notch, said second continuously arcuate notch adjacent to said first continuously arcuate notch along said back edge and spaced a first distance from said first continuously arcuate notch along said back edge, said second continuously arcuate notch extending from a third position along said back edge to a fourth position along said back edge, said first distance defined by a first length along said back edge between said second position and said third position, said second width defined between said third position and said fourth position along said back edge; and a third continuously arcuate notch having a third radius of curvature and a third width along said back edge and extending into said back edge said first depth along said third radius of curvature, said first depth being a maximum depth of said third continuously arcuate notch, said third continuously arcuate notch adjacent to said second continuously arcuate notch along said back edge and spaced said first distance from said second continuously arcuate notch along said back edge, said second continuously arcuate notch thus positioned between said first continuously arcuate notch and said third continuously arcuate notch along said back edge, said third continuously arcuate notch extending from a fifth position along said back edge to a sixth position along said back edge, said first distance also defined by a second length along said back edge between said fourth position and said fifth position, said third width defined between said fifth position and said sixth position along said back edge; and wherein said first radius of curvature and said second radius of curvature and said third radius of curvature are all different from one another.

2. The band saw blade of claim 1 wherein said first depth is less than one hundredth of one inch.

3. The band saw blade of claim 1 wherein all of said first radius of curvature and said second radius of curvature and said third radius of curvature are at least four orders of magnitude greater than said first depth.

4. The band saw blade of claim 1 wherein the smallest of said first radius of curvature and said second radius of curvature and said third radius of curvature is at least two-thirds of the largest of said first radius of curvature and said second radius of curvature and said third radius of curvature.

5. The band saw blade of claim 1 wherein said first distance is greater than all of said first width and said second width and said third width.

6. The band saw blade of claim 1 wherein the smallest of said first width and said second width and said third width is at least three-quarters of the largest of said first width and said second width and said third width.

7. The band saw blade of claim 1 wherein all of said first radius of curvature and said second radius of curvature and said third radius of curvature are at least one hundred and thirty inches.

8. The band saw blade of claim 1 wherein all of said first width and said second width and said third width are at least three inches.

9. The band saw blade of claim 1 wherein all of said first radius of curvature and said second radius of curvature and said third radius of curvature are less than two hundred inches.

10. The band saw blade of claim 1 wherein all of said first width and said second width and said third width are between three and four inches.

11. The band saw blade of claim 1 wherein said first depth is less than or equal to said tooth height variation.

* * * * *